US011936058B2

(12) United States Patent
Sekar et al.

(10) Patent No.: US 11,936,058 B2
(45) Date of Patent: Mar. 19, 2024

(54) ELECTRIC VEHICLE BATTERY PACK HAVING BOTTOM STRIKE SHIELD

(71) Applicant: Rivian IP Holdings, LLC, Plymouth, MI (US)

(72) Inventors: Vignesh Sekar, Westland, MI (US); Jagannathan Shankar Mahadevan, Canton, MI (US); Anish Shah, Ann Arbor, MI (US); Tyler Collins, Irvine, CA (US); Zubin Hareshkumar Padia, Canton, MI (US); Nathaniel C. Wynn, Tustin, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 16/682,738

(22) Filed: Nov. 13, 2019

(65) Prior Publication Data

US 2020/0152927 A1 May 14, 2020

Related U.S. Application Data

(60) Provisional application No. 62/760,635, filed on Nov. 13, 2018.

(51) Int. Cl.
*H01M 50/242* (2021.01)
*B60L 50/64* (2019.01)
(Continued)

(52) U.S. Cl.
CPC ........... *H01M 50/242* (2021.01); *B60L 50/64* (2019.02); *B62D 25/20* (2013.01); *H01M 50/207* (2021.01);
(Continued)

(58) Field of Classification Search
CPC ............ H01M 50/242; H01M 50/233; H01M 50/207; H01M 50/24; H01M 50/249;
(Continued)

(56) References Cited

U.S. PATENT DOCUMENTS 5,555,950 A * 9/1996 Harada ..................... B60K 1/04
180/68.5
5,833,023 A * 11/1998 Shimizu ................. B62D 21/00
180/68.5

(Continued)

FOREIGN PATENT DOCUMENTS

| CN | 102468454 A | 5/2012 |
|---|---|---|
| JP | 2015 189092 | 11/2015 |
| JP | 2015-224027 A | 12/2015 |

OTHER PUBLICATIONS

How Do Sandwich Panels Work?—Aerospace Engineering Blog <https://aerospaceengineeringblog.com/sandwich-panel/> (Year: 2013).*

(Continued)

*Primary Examiner* — Matthew T Martin
*Assistant Examiner* — Jessie Walls-Murray
(74) *Attorney, Agent, or Firm* — Haley Guiliano LLP

(57) ABSTRACT

An electric vehicle battery pack with a strike shield affixed to its bottom. The strike shield provides structural support to withstand ground strikes without damaging the batteries within the battery pack. The strike shield is a mixed material sandwich bottom plate structure having a composite top layer, a middle core with one or more hollow members adhesively connected or welded together, or a single integrated structure with elongated stiffeners and/or a base member with elongated channels for stiffness, and a composite bottom layer.

20 Claims, 3 Drawing Sheets

(51) Int. Cl.
  *B62D 25/20* (2006.01)
  *H01M 50/207* (2021.01)
  *H01M 50/224* (2021.01)
  *H01M 50/233* (2021.01)
  *H01M 50/24* (2021.01)
  *H01M 50/249* (2021.01)
  *H01M 50/271* (2021.01)

(52) U.S. Cl.
  CPC ......... *H01M 50/233* (2021.01); *H01M 50/24* (2021.01); *H01M 50/249* (2021.01); *H01M 50/271* (2021.01); *H01M 50/224* (2021.01); *H01M 2220/20* (2013.01)

(58) Field of Classification Search
  CPC .. H01M 50/20; H01M 50/224; H01M 50/271; H01M 2220/20; B62D 25/20; B62D 29/001; B60L 50/64; Y02T 10/70; Y02E 60/10
  See application file for complete search history.

(56) References Cited

U.S. PATENT DOCUMENTS

| | | | | |
|---|---|---|---|---|
| 8,393,129 B2 * | 3/2013 | Arsene | ................. | E04C 2/3405 |
| | | | | 52/783.17 |
| 9,281,505 B2 * | 3/2016 | Hihara | ................... | B62D 25/20 |
| 10,308,290 B1 | 6/2019 | Dequine | | |
| 2008/0315629 A1 * | 12/2008 | Abe | ...................... | B62D 35/02 |
| | | | | 296/193.07 |
| 2011/0076435 A1 | 3/2011 | Tachibana | | |
| 2012/0160088 A1 * | 6/2012 | Rawlinson | .......... | H01M 50/213 |
| | | | | 89/937 |
| 2012/0270095 A1 * | 10/2012 | Kim | .................... | H01M 50/209 |
| | | | | 429/159 |
| 2012/0282516 A1 * | 11/2012 | Kim | ...................... | H01M 50/20 |
| | | | | 429/159 |
| 2014/0182958 A1 * | 7/2014 | Rawlinson | .............. | B60L 50/66 |
| | | | | 180/68.5 |
| 2015/0171485 A1 | 6/2015 | Rawlinson | | |
| 2015/0318525 A1 * | 11/2015 | Maguire | ................ | H01M 50/20 |
| | | | | 429/96 |
| 2015/0336452 A1 | 11/2015 | Decker | | |
| 2016/0272246 A1 | 9/2016 | Berger | | |
| 2018/0105209 A1 * | 4/2018 | Fees | .................... | H01M 50/249 |
| 2018/0272887 A1 * | 9/2018 | Wiles | .................... | H01M 50/20 |
| 2019/0100090 A1 * | 4/2019 | Matecki | .................... | B60K 1/04 |
| 2019/0248419 A1 * | 8/2019 | Mukaigawa | .......... | B62D 25/025 |
| 2019/0334144 A1 * | 10/2019 | Kim | .................... | B23K 9/173 |
| 2020/0144565 A1 * | 5/2020 | Zeng | .................... | B60L 3/0007 |
| 2021/0111386 A1 * | 4/2021 | Kellner | ................... | B60L 50/64 |
| 2021/0402861 A1 * | 12/2021 | Aitharaju | ........... | B62D 25/2009 |

OTHER PUBLICATIONS

International Search Report and Written Opinion in PCT/US2019/061214 dated Feb. 7, 2020.

Zou Zhengyao, Wang Ruoping, "New Energy Vehicle Technology", National Defense Industry publishing house, Jul. 31, 2012, pp. 130-132. (Chinese language, English Machine Translation attached).

* cited by examiner

ELECTRIC VEHICLE BATTERY PACK HAVING BOTTOM STRIKE SHIELD

CROSS REFERENCE TO RELATED APPLICATION

This application claims the benefit of U.S. Provisional Patent Application No. 62/760,635, filed Nov. 13, 2018, the disclosure of which is hereby incorporated by reference herein in its entirety.

INTRODUCTION

The present disclosure is directed to electric vehicle battery packs. More specifically, the present disclosure is directed to electric vehicle battery packs having bottom strike shields.

SUMMARY

A vital component of current electric vehicles is the battery pack. Conventional battery packs perform a number of functions, including providing a protective enclosure to withstand crashes, ground strikes, or other impacts, routing of electrical wires, and containment of battery fires.

The ability to withstand ground strikes is of particular concern with certain vehicles such as electric off-road vehicles. The uneven terrain such vehicles often traverse results in a high risk of ground strikes during driving. The battery packs of these vehicles must withstand such ground strikes without puncturing, crushing, or otherwise structurally compromising the batteries or other components within.

Accordingly, described herein is a strike shield affixed to the bottom of the battery pack, which provides structural support to withstand ground strikes without damaging the batteries and other components within the battery pack. The strike shield is a mixed material sandwich bottom plate structure having a top layer (e.g., a composite layer), a middle core with multiple hollow members adhesively connected or welded together or a single integrated structure with elongated stiffeners and/or a base member with elongated channels for stiffness, and a bottom layer (e.g., a composite layer or a metal layer such as steel).

In some embodiments, the hollow members can be high strength aluminum extrusions for example, and can also each have a substantially rectangular cross section. This cross section may be of any dimensions, including for instance a height between approximately 10 mm and approximately 20 mm, and/or a width between approximately 75 mm and approximately 125 mm, and/or a wall thickness between approximately 1.5 mm and approximately 3.5 mm. Any height, width, and wall thickness values are contemplated. As a specific but nonlimiting example, the cross section may have a height of approximately 15 mm, a width of approximately 100 mm, and a wall thickness of approximately 2.5 mm.

The top layer may, for example, be made of any composite material, such as a carbon fiber or aramid fiber composite body having one or more fiber layers. These fiber layers may be of any thickness, such as a thickness between approximately 1 mm and approximately 3 mm.

Similarly, the bottom layer may, for example, also be made of any composite material. As one example, the bottom layer may be constructed identical or similar to the composite top layer. As another example, the bottom layer may be a carbon fiber or aramid fiber composite structure, and may additionally or alternatively have a steel layer. This steel layer may be of any thickness, such as a thickness between approximately 0.4 mm and approximately 0.8 mm.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to an electric vehicle battery pack with a strike shield affixed to its bottom. The strike shield provides structural support to withstand ground strikes without damaging the batteries within the battery pack. The strike shield is a mixed material sandwich bottom plate structure having a top layer, a middle core with one or more hollow members adhesively connected or welded together, or a single integrated structure with elongated stiffeners and/or a base member with elongated channels for stiffness, and a bottom layer.

Figure 1:
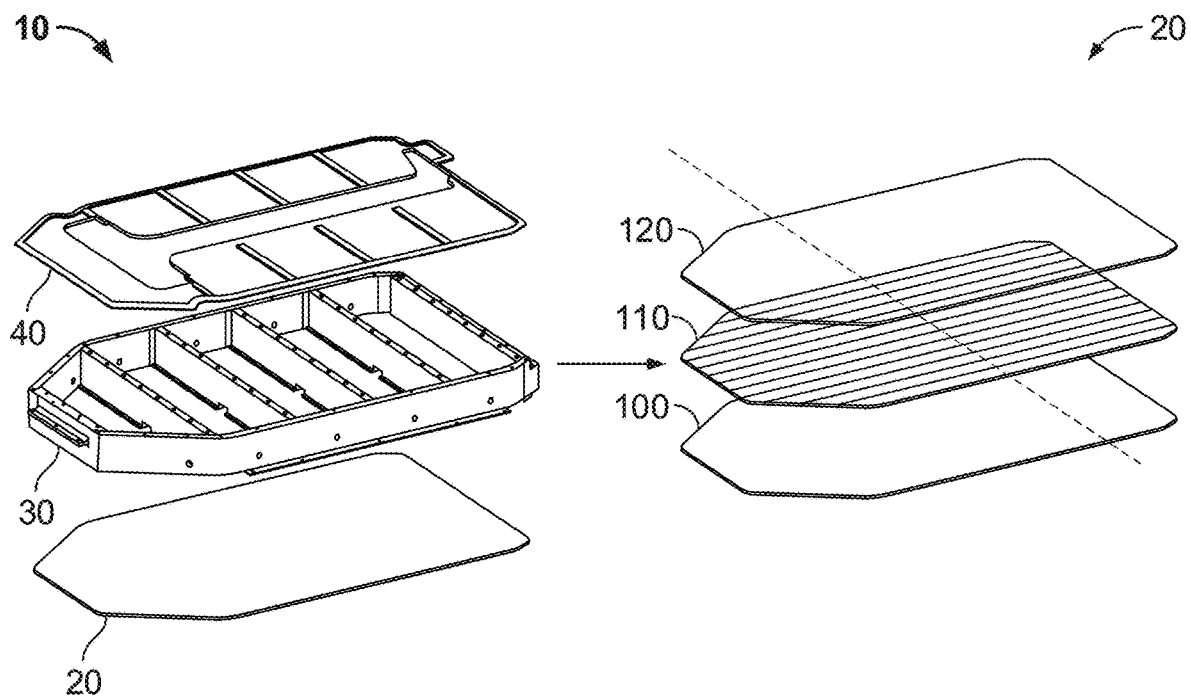
FIG. 1 illustrates isometric exploded views of an exemplary battery pack and an exemplary strike shield, in accordance with some embodiments of the disclosure.

An exploded view of an exemplary battery pack is shown on the left side of FIG. 1. Here, strike shield 20 is the bottom plate or lower layer of the battery pack 10, and is affixed to the bottom of the battery pack frame 30. An exploded view of the strike shield 20 is shown on the right side of FIG. 1. The strike shield 20 top layer 120 is nearest the frame 30 and is affixed thereto when the battery pack 10 is assembled. The middle core 110 is attached to the top layer 120 with an adhesive, and the bottom layer 100 is also adhesively attached to the middle core 110 with an adhesive (e.g., the same adhesive). Any adhesive may be used to bond the layers of the strike shield 20 together. For example, a structural 2-part epoxy may be used. In embodiments employing a metal bottom layer as discussed below, the middle core 110 and bottom layer 100 may be spot welded instead of affixed to each other with an adhesive.

In some embodiments, the top layer 120 is a composite layer. The composite layer may be a bi-directional twill woven carbon fiber ply in an epoxy matrix. Alternatively, the composite layer may be an aramid fiber ply in an epoxy matrix. The matrix may also be a phenolic-based matrix. The top layer 120 may have any thickness between 1 mm and 3 mm, but more specifically may have a thickness of 2 mm. Multiple plies may also be used. In other embodiments, the composite layer may comprise glass fibers in an epoxy or other matrix. Glass fibers may be used, for example, for reduced cost and to prevent galvanic corrosion that may occur between carbon fibers and an aluminum middle core 110. Any fiber or combinations of fiber and any matrix may be employed, however.

In some embodiments, the bottom layer 100 may also be a composite layer. As one example, the bottom layer 100 may have a unidirectional carbon fiber layer and one or more aramid plies, with an epoxy matrix. As with the top layer 120, any number of plies may be used, of any type of fiber and with any matrix. Alternatively, the bottom layer 100 may be a steel layer, for example a 0.4 mm to 0.8 mm thickness steel layer. As a more specific example, the steel layer may be a 0.6 mm thick steel layer. The steel layer may be a stamped steel layer.

Figure 2:
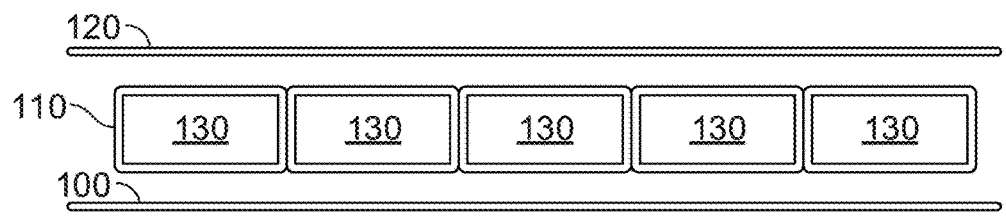
FIG. 2 is a cross-sectional view taken along the dashed line of the exemplary strike shield of FIG. 1.

The middle core 110 comprises several parallel elongated hollow members glued or welded together to form a single layer. FIG. 2 is a cross-sectional view of the layers of the strike shield 20, taken along the dashed line of FIG. 1. Each hollow member 130 may have a rectangular cross section, and neighboring members 130 are bonded (e.g., glued or welded) together to form a single layer of rectangular cells placed adjacent to each other, as seen in the view of FIG. 2. When constructed with rectangular cross sections, the elongated members 130 may have a height between 10 mm and 20 mm, a width between 75 mm and 125 mm, and a wall thickness between 1.5 mm and 3.5 mm. As a more specific example, the elongated members may be approximately 15 mm in height and 100 mm in width, with a 2.5 mm wall thickness, although any dimensions are contemplated. It is also noted that the elongated hollow members 130 may be of any cross sectional shape, and are not limited to the rectangular profile shown. An alternate design, with a different profile, is shown below in connection with FIG. 3. The elongated members 130 can be extruded aluminum members, and may for example be constructed of 6082 aluminum alloy extruded into the rectangular members 130 shown in FIG. 2, although any material may be used. In particular, any extrudable aluminum alloy may be employed.

Figure 3:
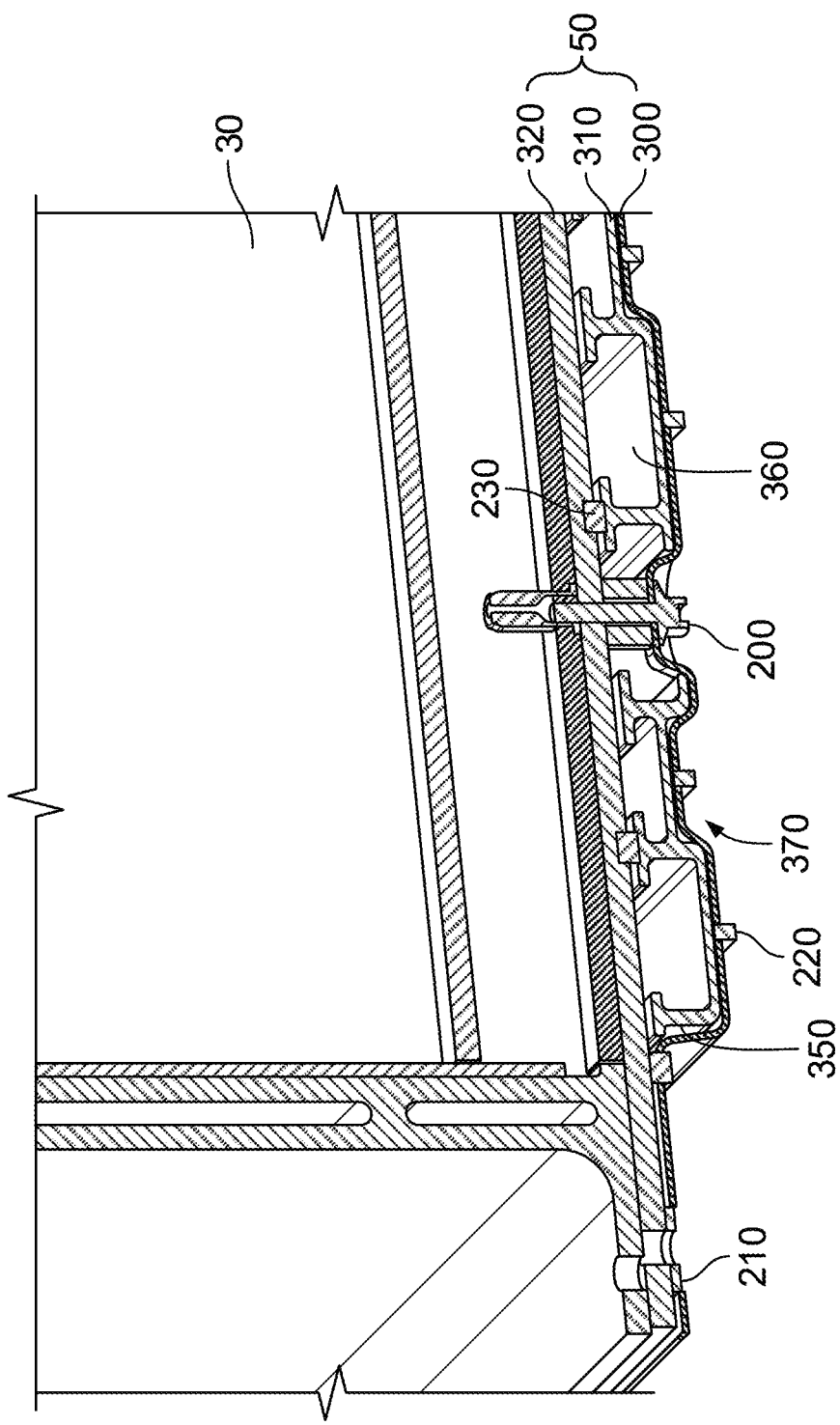
FIG. 3 is a cross-sectional view showing details of another exemplary strike shield and its attachment to an exemplary battery pack, in accordance with some embodiments of the disclosure.

FIG. 3 is a cross-sectional view showing details of another exemplary strike shield 50 and its attachment to an exemplary battery pack, in accordance with some embodiments of the disclosure. The strike shield 50 of FIG. 3 comprises a bottom layer 300, a middle core 310, and a top layer 320. The bottom layer 300, middle core 310, and top layer 320 may be made of the same materials as corresponding bottom layer 100, middle core 110, and top layer 120 described above. For example, bottom layer 300 may be a composite layer such as a carbon fiber or aramid fiber composite layer, middle core 310 may be an extruded aluminum layer, and top layer 320 may be a composite layer such as a carbon fiber or aramid fiber composite layer. Layers 300, 310, 320 may be affixed to each other in any manner, such as with removable fasteners, non-removable fasteners, an adhesive, or the like. As described further below, strike shield 50 of FIG. 3 is constructed as a removable structure, for easy removal to facilitate repair or replacement.

Here, the strike shield 50 is shown attached to a bottom surface of frame 30 with a number of fasteners 200. Similarly, the bottom layer 300 and top layer 320 are attached to each other with a number of fasteners 210 as shown. Fasteners 200 and 210 may each be any fastener, such as a screw, nail, bolt, rivet, an adhesive, or any other suitable device for affixing two structures to each other. Fasteners 210 extend through bottom layer 300 and top layer 320, in areas where middle core 310 is not present, to affix the top layer 320 to the bottom layer 300 and to affix the middle core 310 therebetween. Fasteners 200 extend through all three layers 300, 310, 320 of strike shield 50 and into battery pack frame 30, for removable attachment of the strike shield 50 to battery pack frame 30. Accordingly, strike shield 50 may be attached to frame 30 with fasteners 200, and removed therefrom by removing fasteners 200. The strike shield 50 of FIG. 3 may thus be readily removed and reattached if desired, using fasteners 200. In this manner, strike shield 50 may be more easily repaired and replaced, or may be removable for easier access to components within battery pack 10.

A number of features 220 may be added to act as locating features for strike shield 50 and bottom layer 300, and to increase rigidity and strength of the strike shield 50. Features 220 may be made of any material, such as a structural adhesive, a metal, a plastic, or the like. Additionally, features 230 may be added to dampen or prevent rattle or vibration which may occur between composite top layer 320 and metallic middle core 310. Features 230 may be made of any material suitable for damping or preventing vibration, such as an adhesive, a plastic, or the like.

FIG. 3 illustrates certain embodiments in which middle core 310 is not constructed of separate parallel members affixed to each other, but is instead a single integral structure with a number of elongated stiffener members 350 extending vertically from base member 360. The base member 360 may be formed with areas of differing elevation, to form a number of elongated channels 370 therein. The elongated channels 370 and stiffener members 350 may extend along a major axis of the middle core 310 (perpendicular to the plane through which the cross section of FIG. 2 is taken), to increase the rigidity and strength of middle core 310. Any number and dimensions of channels 370 and stiffener members 350 are contemplated. Furthermore, it may be observed that adjacent stiffener members 350 and the portion of base member 360 therebetween form a single integral structure that, in the embodiment of FIG. 3, can be considered a rigid, elongated, and generally U-shaped member that provides structural rigidity and strength to middle core 310. The middle core 310 may thus be thought of as comprising any number of such U-shaped members each connected to and extending continuously from the other in generally parallel arrangement, to form a single integral structure. These U-shaped members may be of the same or varying geometry. The embodiment of FIG. 3 illustrates two differently sized U-shaped members as shown, with smaller U-shaped members next to larger U-shaped members in alternating manner. That is, the base member 360 may be formed with multiple different elevations for added stiffness, potential aerodynamic benefits, and the like.

It will also be understood that the middle core 310 may also be thought of as adjacent I-beams that have elongated and connected bottom flanges that form a single integral structure. Any geometry and shape of these members is contemplated. For instance, instead of U-shaped members, middle core 310 may have a number of V-shaped members, fully-enclosed members, or members of any other cross-sectional shape or shapes that provide increased rigidity and/or strength. Additionally, while a single strike shield 50 is shown, other embodiments may utilize multiple smaller strike shields 50 that collectively cover the bottom of battery pack frame 30. Such configurations allow for removal and/or replacement of smaller portions of the strike shield 50 when, for example, only a portion of strike shield 50 is damaged or should be replaced. Each of these smaller strike shields 50 may be configured in any manner disclosed herein, to cover portions of battery pack frame 30.

Figure 4:
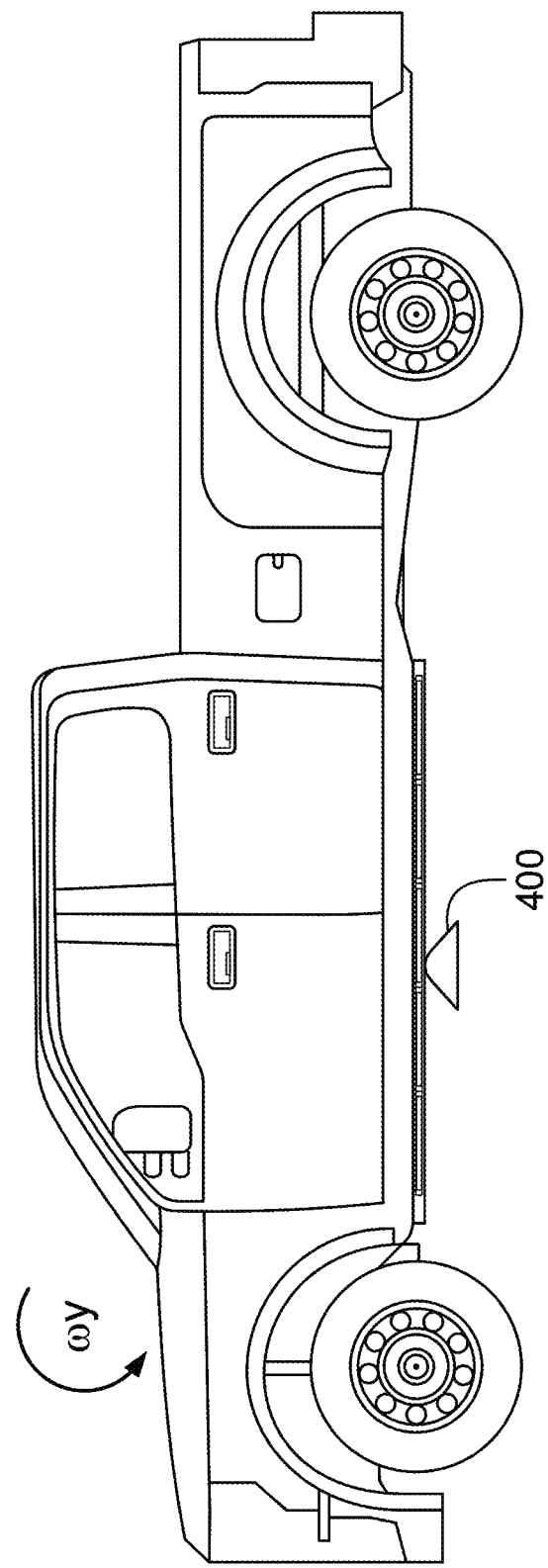
FIG. 4 illustrates an exemplary loading condition of an exemplary strike shield, in accordance with some embodiments of the disclosure.

FIG. 4 illustrates an exemplary loading condition of the strike shield. A ground strike onto a generally conical stationary object 400 has been simulated, for an off-road vehicle weighing one half of a gross vehicle weight rating (GVWR) of 3470 kg. It has been found that a strike shield constructed as above prevents the object from crushing the shield and protruding into the battery pack, and also prevents battery pack deformation significant enough to cause damage to the internal battery modules. Accordingly, the strike shield construction of the present disclosure offers sufficient protection against ground strikes for off-road electric vehicles, while also having lower weight than conventional steel strike shields and having lower cost than conventional monolithic high strength carbon fiber composite strike shields.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, the middle core may have extruded members of any cross section, any aluminum alloy, and any dimensions. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure. All dimensional values are approximate, and may vary.

What is claimed is:

1. A battery pack, comprising:
    a frame for surrounding batteries positioned in an interior space therein; and
    a strike shield comprising:
        an upper layer facing the frame;
        a middle core, the upper layer positioned between the frame and the middle core, the middle core comprising a number of smaller and larger rigid and elongated U-shaped members arranged in an alternating manner; and
        a lower layer comprising alternating U-shaped channels, arranged in the alternating manner of the U-shaped members and having an upper surface that is affixed to a bottom surface of the U-shaped members, the middle core positioned between the upper layer and the lower layer.

2. The battery pack of claim 1, wherein the rigid and elongated U-shaped members comprise extruded aluminum.

3. The battery pack of claim 1, wherein the upper layer comprises one or more of carbon fibers, glass fibers, or aramid fibers.

4. The battery pack of claim 1, wherein the upper layer comprises a fiber layer having a thickness of approximately 2 mm.

5. The battery pack of claim 1, wherein the lower layer comprises one or more of carbon fibers, glass fibers, or aramid fibers.

6. The battery pack of claim 1, wherein the lower layer comprises a steel layer, the steel layer having a thickness between approximately 0.4 mm and approximately 0.8 mm.

7. A strike shield for a battery pack, the strike shield comprising:
    an upper layer having a first surface for attachment to a frame of the battery pack, and an opposing second surface;
    a middle core connected to the second surface of the upper layer, the middle core comprising a number of smaller and larger rigid and elongated U-shaped members arranged in an alternating manner; and
    a lower layer comprising alternating U-shaped channels arranged in the alternating manner of the U-shaped members and having an upper surface that is affixed to a bottom surface of the U-shaped members so that the middle core is positioned between the upper layer and the lower layer.

8. The strike shield of claim 7, wherein the rigid and elongated U-shaped members each have a wall thickness between approximately 1.5 mm and approximately 3.5 mm.

9. The strike shield of claim 8, wherein the wall thickness is approximately 2.5 mm.

10. The strike shield of claim 7, wherein the rigid and elongated U-shaped members comprise extruded aluminum.

11. The strike shield of claim 7, wherein the upper layer comprises one or more of carbon fibers, glass fibers, or aramid fibers.

12. The strike shield of claim 7, wherein the upper layer comprises a fiber layer having a thickness between approximately 1 mm and approximately 3 mm.

13. The strike shield of claim 12, wherein the thickness of the fiber layer is approximately 2 mm.

14. The strike shield of claim 7, wherein the lower layer comprises one or more of carbon fibers, glass fibers, or aramid fibers.

15. The strike shield of claim 7, wherein the lower layer comprises a steel layer.

16. The strike shield of claim 15, wherein the steel layer has a thickness between approximately 0.4 mm and approximately 0.8 mm.

17. The strike shield of claim 16, wherein the thickness of the steel layer is approximately 0.6 mm.

18. The battery pack of claim 1, wherein the middle core is formed with areas of differing elevation to form a number of elongated members therein.

19. The strike shield of claim 7, wherein the middle core is formed with areas of differing elevation to form a number of elongated channels therein.

20. A strike shield comprising:
    an upper layer having a first surface for attachment to a frame of a battery pack, and an opposing second surface; and
    a middle core connected to the second surface of the upper layer, the middle core comprising a number of rigid and elongated U-shaped members, wherein:
        the number of the rigid and elongated U-shaped members comprise first U-shaped members having a first size and second U-shaped members having a second size different than the first size;
        the first U-shaped members and the second U-shaped members are arranged in an alternating manner; and
    a lower layer connected to the middle core so that the middle core is positioned between the upper layer and the lower layer, wherein the lower layer comprises alternating U-shaped channels arranged in the alternating manner of the U-shaped members and having an upper surface that is affixed to a bottom surface of the U-shaped members.

* * * * *